March 7, 1939.  H. F. PARKER ET AL  2,150,006

MEASURING AND CONTROL METHOD AND APPARATUS

Filed April 21, 1933    2 Sheets-Sheet 1

Humphrey F. Parker
Julius Reeves
INVENTORS

BY John J. Rogan
ATTORNEY

March 7, 1939.  H. F. PARKER ET AL  2,150,006
MEASURING AND CONTROL METHOD AND APPARATUS
Filed April 21, 1933  2 Sheets-Sheet 2
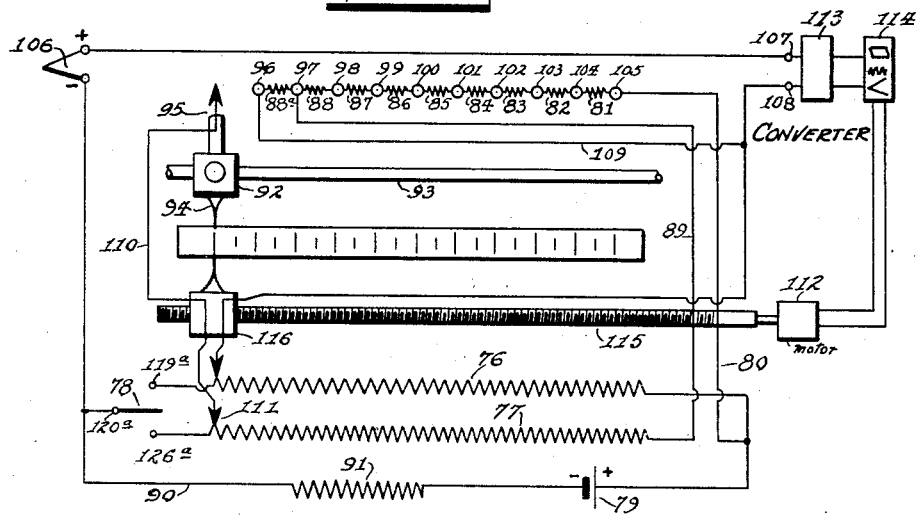
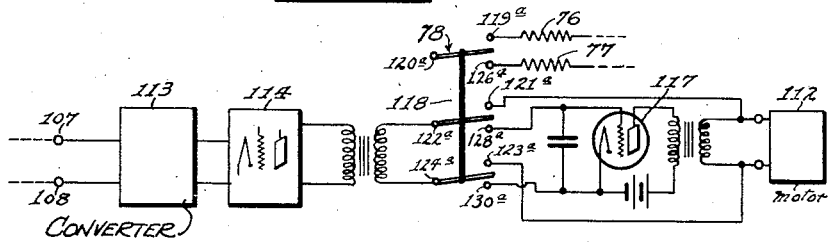
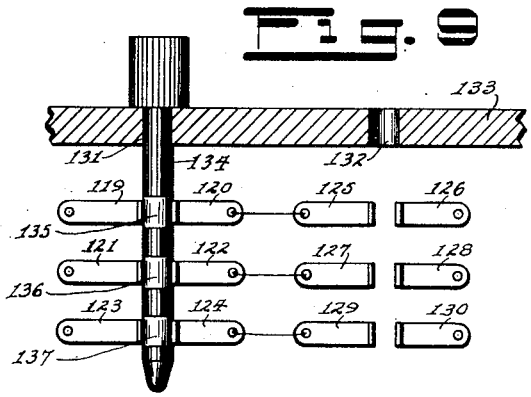
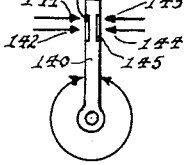
Humphrey F. Parker
Julius E. Aceves
INVENTORS
BY John J. Rogan
ATTORNEY Patented Mar. 7, 1939

2,150,006

UNITED STATES PATENT OFFICE 2,150,006

MEASURING AND CONTROL METHOD AND APPARATUS

Humphrey F. Parker and Julius G. Aceves, New York, N. Y., assignors, by direct and mesne assignments, to Brown Instrument Company, Philadelphia, Pa., a corporation of Pennsylvania Application April 21, 1933, Serial No. 667,237

16 Claims. (Cl. 175—183)

The present invention relates to measuring and control systems and with particularity to systems involving the measurement and/or recording of electric currents and/or potentials and their utilization for control purposes.

A principal object of the invention is to provide a method of measuring and/or recording potential or current variations of minute magnitude.

Another object is to provide a method of employing current or potential variations of minute magnitude to control the operation of electromechanical mechanism.

One of the most serious drawbacks to the measurement of minute potential or current variations is the difficulty of electrically amplifying such variations with ordinary vacuum tube amplifying systems. This is particularly true in the case of small direct currents or D. C. potentials. A further object of the invention is therefore to provide a method of translating minute D. C. potential variations into similar A. C. variations which are capable of extensive and accurate amplification employing ordinary electric discharge amplifier devices of the A. C. type.

A still further object of the invention is to provide a rugged and highly accurate instrument for indicating and/or recording potential or current variations and/or their utilization for control purposes.

A feature of the invention relates to an improved instrument for indicating and/or recording and/or controlling temperature conditions.

While various devices have heretofore been utilized for recording temperature conditions, one of the most satisfactory as regards accuracy and reliability is the so-called potentiometer type recorder. In such devices the thermo-electric currents are utilized to impart movement directly to a galvanometer or other similar sensitive movable element. In turn this movable element is employed to control the operation of a motor or similar device for producing a "balance". It is at once obvious that such devices are relatively expensive since they require the assembly and adjustment of a galvanometer or similar mechanism. Furthermore, such galvanometer mechanisms materially curtail the ruggedness of the instrument as a whole, and introduce limitations thereon. For example, unless the galvanometer is of the "dead beat" type, it tends to oscillate around its ultimate control position. On the other hand, so-called "dead beat" galvanometers require a considerable time interval before complete deflection. Accordingly, one of the outstanding features of the present invention is to provide a potentiometer-type recorder which is free from the limitations of what may be termed the galvanometer-control type. In carrying this feature of the invention the thermoelectric E. M. F.'s are preferably amplified by a potential amplifier, which amplifier controls directly the potentiometer balancing mechanism.

Another feature of the invention relates to an automatic potentiometer mechanism for recording direct current variations in conjunction with means for translating the said variations into corresponding alternating current variations which can be readily amplified by well known A. C. amplifiers.

Another feature of the invention relates to a method of recording temperature variations by translating the said temperature variations into substantially sinusoidal electric waves which may then be readily amplified by an alternating current amplifier.

A further feature of the invention relates to a method of measuring and/or recording relatively small D. C. variations by first translating the said variations into corresponding A. C. variations and then retranslating the A. C. variations back into corresponding D. C. variations.

A further feature of the invention relates to a thermoelectrically controlled instrument employing an automatic potentiometer mechanism and a tuned amplifier for controlling said mechanism.

A still further feature of the invention relates to a temperature recorder employing a novel form of converter for converting small thermoelectric D. C. potentials into amplified D. C. potentials, without requiring complicated or critically adjustable amplifiers.

A still further feature relates to an improved control mechanism for a potentiometer-type recording instrument.

A still further feature relates to a potentiometer-type temperature recorder having different recording ranges in conjunction with a variable-stage amplifier for association with the different ranges of the potentiometer.

A still further feature relates to the novel organization, arrangement and relative location of parts which go to make up a simple, rugged and highly accurate temperature recording instrument.

Other features and advantages not specifically enumerated will be apparent after a consideration of the following detailed descriptions and the appended claims.

While the invention will be disclosed herein as embodied in a specific type or types of instrument it will be understood that this is merely illustrative and for the purpose of explaining the invention.

Accordingly, Fig. 1 of the drawings shows in schematic form a recording instrument or system embodying features of the invention;

Fig. 7 shows an instrument or system similar to Fig. 1 or Fig. 2 and having a multiple range;

Fig. 8 is a schematic wiring diagram of a variable stage amplifier for use in the system of Fig. 7;

Fig. 9 is a detail view of the selective switch schematically shown in Fig. 8; and Fig. 10 is a partial schematic diagram of a modified form of control relay for use with the invention.

Figure 1:
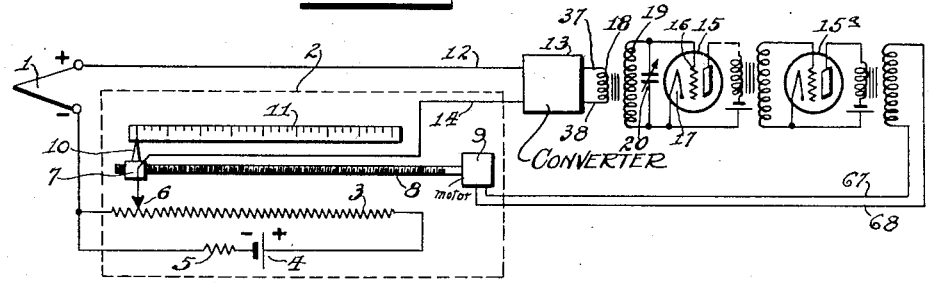

Referring more particularly to Fig. 1 of the drawings, there is indicated by the numeral 1 a thermo-electric couple or junction which may be of any well-known type. It will be understood of course that the element 1 is merely chosen as illustrative of one source of small D. C. potential. The dotted rectangle 2 represents an automatic potentiometer, it being understood that the showing in this respect is essentially schematic, and only sufficient parts of the potentiometer are illustrated to enable the invention to be understood. In general the potentiometer comprises a slide wire resistance 3 which has connected thereacross a standard or known source of E. M. F. 4. In actual practice the source 4 may consist of a cell or the like which can be checked periodically against a standard cell (not shown). A current limiting resistance 5 may be connected in series with the cell 4 if desired. The movable contact arm of the slide wire resistance, indicated by the numeral 6, is attached to a suitable carrier 7 which is capable of being moved along the length of the wire 3. For this purpose the carrier 7 may be in the form of an internally threaded nut adapted to ride on the screw-threaded member 8 when the latter is rotating. A suitable motor 9 is provided and is suitably coupled to the threaded member 8 to rotate the latter at the desired speed and in the desired direction. The carrier 7 may, although not necessarily, be provided with an indicating pointer 10 adapted to register with a properly calibrated scale 11. While the drawings show the slide wire 3 extending in a straight line, and the contact 6 is shown as being movable, it will be understood that any convenient arrangement between the wire 3 and the contact 6 may be made. For example, the contact 6 may be stationary and the slide wire 3 may be moved. Similarly, the slide wire may be in the form of a circle or helix if desired.

The positive element of the thermo-couple 1 is connected by conductor 12 to one terminal of a converting device 13 described in detail hereinbelow, and another terminal of this latter device is connected by conductor 14 to the contact 6. As indicated in the drawings, the positive terminal of the standard source 4 is connected to one end of the slide wire 3 while the negative terminal of this source is connected to the other terminal of the slide wire, the latter terminal also being connected to the negative element of the thermocouple 1. If desired, an additional compensating or cold junction (not shown) may be connected with the device 1 for purposes well known in the thermo-electric art.

Figure 3:
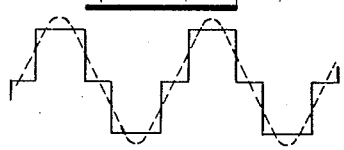
Fig. 3 is a diagrammatic figure illustrating one type of current to be used in practising the invention.

Suffice it for the present to state that the device schematically indicated by the numeral 13 is capable of converting the varying minute D. C. thermo-electric potentials from the device 1 into corresponding alternating current potentials, preferably of sinusoidal wave shape. The output side of the converter 13 is coupled to an amplifier preferably of the potential amplifying type such as a distortionless electron discharge amplifier. As indicated in Fig. 1, this amplifier comprises two stages 15, 15ª, although a greater or less number of stages may be employed. The converted impulses from the device 13 are impressed across the grid 16 and cathode 17 of the amplifier 15 by means of any suitable form of coupling transformer, indicated in the drawings by the numerals 18 and 19. The circuits are preferably such that the unidirectional currents from device 1 are caused to flow in opposite directions through primary winding 18, this reversal being effected at a predetermined fixed frequency. Preferably, although not necessarily, the secondary 19 is tuned by means of a condenser 20 to shape the waves from the device 13 to substantially sinusoidal form. As a result of this arrangement the circuits for the amplifier 15 may be of any well-known type such as used with so-called A. C. amplifiers, thus obviating the difficulties attendant upon amplifying small D. C. potentials with so-called D. C. amplifiers. If desired, the second stage 15ª may likewise be tuned to the same frequency as the amplifier stage 15. The output of the amplifier 15ª will therefore consists of a substantially sinusoidal wave as indicated by the dotted curve of Fig. 3. The amplitude of this wave will be a function of the D. C. potential generated by the device 1. Consequently this amplified alternating current output may be used to control the motor 9 in any well-known manner, it being understood of course that the motor 9 or its control mechanism is such as to be controlled by alternating current.

By means of the foregoing arrangement, therefore, the minute potentials generated by the device 1 are amplified by a potential amplifier to produce power to control the motor 9 directly. It will be understood, of course, that the current from the amplifier 15ª may be used not only to control the duration of rotation of the motor 9, but also its direction of rotation, depending upon its polarity and/or phase with relation to the field or stator windings of the motor or its control apparatus.

Figure 5:
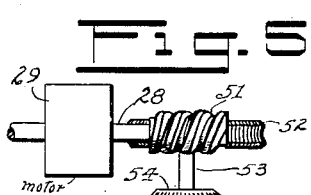
Fig. 5 is a detail view of the potentiometer control mechanism.

In a manner well known in the automatic potentiometer art, the motor 9 rotates the screw 8 to move the contact 6 in the proper direction and to the required extent to effect a balance between the E. M. F. from device 1 and the counter E. M. F. or drop across the slide wire, whereupon the contact 6 becomes stationary. In other words, the motor 9 moves the contact 6 until its positive potential is equal in magnitude to the potential of the positive element of the thermo-couple. The potential across the input terminals of the converter is then zero, resulting in a stoppage of rotation of member 8. It will be understood, of course, that if desired a continuously operating motor may be employed and a selective clutch such as illustrated in Fig. 5 may be employed to control the starting, stopping and direction of rotation of member 8.

Figure 2:
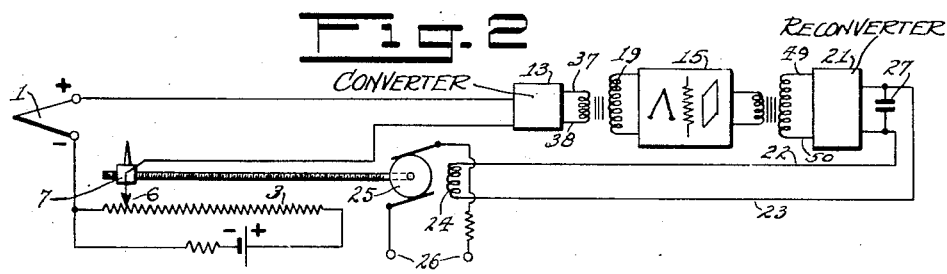
Fig. 2 illustrates schematically a modification of Fig. 1.

Referring to Fig. 2, there is shown a modification of the system of Fig. 1. In this modification, parts corresponding to those of Fig. 1 are designated by the same numerals. Thus the source of the minute unidirectional currents is indicated by the thermal couple 1 which has its positive terminal connected through the converter device 13 to the movable contact 6 of the potentiometer. As hereinabove described, the device 13 is designed to derive from the unidirectional currents a corresponding alternating current which is impressed upon a suitable alternating current amplifier 15. It will be understood, of course, that the rectangle 15 schematically represents one or more stages of amplification. The output of the amplifier 15, consisting of a substantially sinusoidal alternating current of fixed frequency determined by the device 13, is not impressed directly upon the motor control circuit (as in Fig. 1), but is reconverted back into a unidirectional current by means of a suitable device indicated schematically by the rectangle 21. A detailed description of a preferred form of this reconverting device will be given hereinbelow in connection with Fig. 4. The currents from the device 21 will therefore consist of unidirectional waves of varying amplitudes corresponding to the variations from source 1, but of greatly increased amplitude, which amplitude is sufficient to operate a motor, or a motor-control device directly. Thus, as indicated in Fig. 2, the currents from the device 21 are impressed, by means of conductors 22, 23, upon the field windings 24 of the motor 25. The armature of this motor may be supplied from commercial mains 26, which mains may be direct current supply lines.

However, the motor is preferably designed so that the armature does not rotate until the field coils 24 are energized by the currents from the device 21. Preferably, although not necessarily, the output terminals of the device 21 are shunted by a condenser 27 to smooth out any undesired ripples that may exist in the unidirectional current. It will be obvious, therefor, that the direction of rotation of the armature 25 will depend upon the polarity of the current from the conductors 22 and 23, which may be so connected as to provide the same polarity as that produced by the source 1.

The manner of the functioning of the system of Fig. 2 will be obvious from the preceding descriptions. Suffice it to say that the varying unidirectional E. M. F.'s from the source 1 are impressed upon the potentiometer resistance 3 and if at any given instant the E. M. F. produced by the source 1 is not balanced by the arm 6, this arm will be moved in one direction or the other to effect a balance. The movement of the arm 6 as above described is controlled by motor 25, which in turn is controlled, both as to direction and duration of rotation, by the reconverted unidirectional amplified currents flowing over the conductors 22 and 23.

Figure 4:
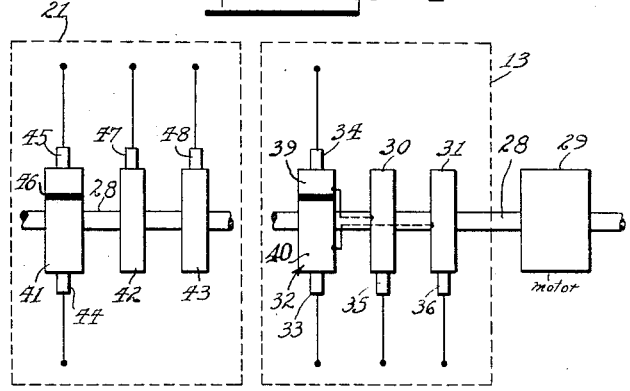
Fig. 4 is a diagrammatic showing of a preferred form of translating device according to the invention.

Referring to Fig. 4, a description will now be given of a preferred form of converter that may be used in the system of Fig. 1, as well as a preferred form of reconverter that may be used in the system of Fig. 2. In Fig. 4 the converter 13 comprises a continuously rotating shaft 28 which may be driven by any suitable form of motor such as the synchronous motor 29, or the like. Insulatingly mounted on the shaft 28 are a pair of slip rings 30, 31 and a two-segment commutator 32. Brushes 33 and 34 are provided for the commutator 32 and corresponding brushes 35 and 36 are provided for the slip rings 30 and 31, respectively. The brushes 33 and 34 are adapted to be connected to the conductors 12 and 14 of Fig. 1 or Fig. 2, while the brushes 35 and 36 are adapted to be connected to the conductors 37 and 38 of either Fig. 1 or Fig. 2. The segment 39 of the commutator 32 is connected with the slip ring 30, and the segment 40 is connected with the slip ring 31. It is obvious therefore that the polarity of the current flowing to slip ring 30 and brush 35 will change each time the segment 39 passes from the brush 34 into contact with the brush 33 and vice versa. Of course this arrangement does not change the polarity of the current or potential impressed upon the potentiometer resistance 3 from the source 1, but merely changes the direction of current flow or potential across the transformer primary 18. The mechanism for reconverting the amplified alternating currents into unidirectional currents, indicated by the rectangle 21 (Fig. 2) comprises a two-segment commutator 41 and a pair of slip rings 42 and 43 insulatingly mounted on the shaft 28. As indicated in the drawings, the shaft may be coupled to or may be part of the same shaft 28 which carries the commutator mechanism of the device 13. The commutator 41 is so mounted that its brushes 44, 45 contact with the insulator segment 46 at the instant that the alternating current from the amplifier 15 (Fig. 2) is passing through zero. The slip ring brushes 47 and 48 are adapted to be connected to the conductors 49, 50 (Fig. 2), while the commutator brushes 44 and 45 are adapted to be connected to the conductors 22 and 23 (Fig. 2). With this arrangement, therefore, since the devices 13 and 21 are operating in synchronism, the current passing out from the brushes 44 and 45 over conductors 22 and 23 is a unidirectional current of varying amplitude corresponding to the varying E. M. F.'s from the source 1. Preferably, the commutators of the devices 13 and 21 are designed so that the duration of the "makes" are substantially equal to the duration of the "breaks", it being understood of course that the brushes and insulator bars may be so arranged that short-circuiting of the commutator sections is prevented.

If desired, the same motor 29 drives the converter and reconverter, respectively, and may also be used in conjunction with a suitable reversing clutch mechanism, to replace the motor 9 (Fig. 1) or the motor 25 (Fig. 2). Thus, as illustrated in Fig. 5, the shaft 28 for the motor 29 carries a worm 51 which in turn engages a worm gear 52, thereby driving the shaft 53 at a suitably reduced speed. Shaft 53 carries a bevelled gear 54 which meshes with the idler gears 55 and 56 so as to drive them in opposite directions. Idler gears 55 and 56 normally spin idly upon shaft 57 and are restrained against longitudinal movement on the shaft by the gear 54 and the bearing members 58 and 59. Shaft 57 has a splined end 60 which is mounted for free sliding movement in the correspondingly splined end 61 of the screw thread 8, which latter screw thread moves the contact arm 6 as above described. For the purpose of selectively controlling the rotation of the gears 55 and 56, and therefore the direction of movement of the contact arm 6, the shaft 57 carries a friction disc 62 which is adapted to be moved into frictional engagement with either the clutch plate 63 or the clutch plate 64. The selective movement of the disc 62 is controlled by another disc 63ª. Engaging the disc 63ª is a bifurcated member 64 which is adapted to be oscillated around its pivot 65 by any suitable control means. For example, the body member 66 may form the armature of a polarized relay or the like, the windings for this relay being energized by the current from the brushes 44, 45 (Fig. 4). Accordingly, depending on the polarity of the current from the brushes 44 and 45 flowing over the conductors 22, 23, the member 64 will be moved either to the right or to the left to control the proper direction of rotation of the screw thread 8. It will be understood, of course, that normally the member 64 is positioned by means of springs or other suitable biasing means so as to maintain the friction disc 62 free of the clutch plates 63 and 64.

Figure 6:
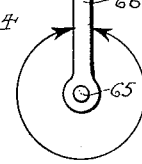
Fig. 6 is a schematic showing of one type of dynamometer that may be used in the systems of Figs. 1 and 2.

Instead of employing a reconverter such as the device 21 (Fig. 2) and a control such as shown in Fig. 5, the output of the amplifier 15ª (Fig. 1) or the amplifier 15 (Fig. 2) may be applied to a dynamometer type of control. For example, as shown in Fig. 6, the conductors 67, 68 (Fig. 1) or the conductors 49, 50 (Fig. 2) may be connected to the moving coil 69 of a dynamometer 70. The stator 71 of this dynamometer may be supplied from an alternating current supply line of suitable frequency. It will be obvious, of course, that this condition may be reversed, the amplified alternating currents from the device 15ª may be impressed on the stator 71 and the supply lines may be connected to the rotor 69. However, in the embodiment of Fig. 6, it is necessary that the amplified control current impressed upon the terminals 72, 73 be in synchronism with the currents from the supply mains 74, 75 and the phase relation between these two currents may be easily controlled by varying the position of the brushes 33 and 34 of the converter device 13. With the proper phase relation between the currents in the stator and rotor, there will be a torque developed whose direction is a function primarily of the polarity of the direct current from the source 1. Consequently, if the rotor 69 (Fig. 6) is attached or otherwise coupled to the member 66 (Fig. 5), the torque developed in the dynamometer control will cause the shaft 57 to slide in its bearings and thus control the direction of rotation of the screw thread 8.

It will be understood, of course, that the arm 7, in addition to moving the sliding contact 6 to control the balance, also causes the movement of a suitable recording stylus or pen over a co-operating reproducing surface, such as a paper chart or the like. This chart may be mounted for gradual movement transversely to the direction of movement of the arm 6, or if desired, the chart may be circular and rotate with respect to the arm 6. Inasmuch as these chart feeding mechanisms are well known in the pyrometric and other recording arts, further description thereof is not believed necessary at this point.

In accordance with the usual practice, the scale 11 will have a marking at one end to correspond to the temperature of the cold junction of the thermocouple system, or to zero degrees F. or C., or to any other suitable base temperature. The scale then will have a maximum reading preferably at a temperature slightly above the maximum temperature at which the thermocouple is to be used. For example, in the case of a chromel-alumel couple, the upper reading on the scale may be approximately 2000° F.

In certain instances it may be desirable to provide the instrument of Fig. 1 or Fig. 2 with a multiple range so as to enable a higher degree of accuracy to be attained over a portion or portions of the scale. An instrument for accomplishing this purpose is schematically illustrated in Fig. 7, from which it will be seen that in general the same arrangement is used as in the instruments of Figs. 1 and 2. However, in addition to the main slide wire 76 there is provided another slide wire 77, the latter slide wire being used when the instrument is to record over a fraction of its total range. For this purpose there is provided a two-position switch 78 which, at its upper or normal position, connects the main slide wire 76 in circuit, when the instrument functions the same as described above in connection with Figs. 1 and 2. When the switch 78 is closed on its lower contact, the auxiliary slide wire 77 is connected in circuit, the standard circuit being traced from the positive pole of the standard cell 79, conductor 80, through the resistor sections 81 to 88 inclusive, conductor 89, the slide wire 77, the lower contact of switch 78, conductor 90, current-limiting resistance 91, to the negative pole of the standard source 79. In addition to the manual switch 78 there is an adjustable carriage 92 which is slidable upon the stationary shaft or guide 93. The carriage 92 carries an indicator or recording pen 94 and a contacting arm 95. Arm 95 is adapted to contact with the contact studs 96 to 105, inclusive. When the instrument is to be used over its total range, as above described the switch 78 is closed on its upper contact and the carriage 92 is moved to its extreme left position as indicated in Fig. 7. Under these circumstances the instrument functions identically as in Fig. 1 to record changes in temperature over the total range of the instrument. When the instrument is to be used for open scale work, the switch 78 is closed on its lower contact and the carriage 92 is moved so as to close contact between the arm 95 and the proper one of the contact studs 96 to 105. Assuming as above that the full range of the instrument is 2000° F. and the secondary ranges are 200° each, when the arm 95 is placed in contact with the stud 96 the instrument will read temperatures from zero to 200° F. When the arm 95 is in contact with the stud 97, the range of the instrument will be from 200° to 400°, and likewise for the remaining contact studs of the series, the range being 200° for each position of the arm 95, until the arm 95 is in contact with the stud 105 the instrument records from 1800° to 2000° F. It will be understood, of course, that the individual open scale ranges are determined by the values of the corresponding individual resistors 81 to 88ª, inclusive. It will be obvious, therefore, that by proper designing of these resistances with relation to one another and with relation to the slide wire, any particular range in the individual open ranges may be attained. For purposes of explanation let it be assumed that the main resistance wire 76 is 2000 units or, for convenience, 2000 ohms. Assuming that the switch 78 is closed on its lower contact, then the resistance 76 is replaced by another resistance of the same value. This resistance consists of ten separate sections each of approximately 200 ohms. Nine of these sections are constituted by the fixed resistors 81 to 88ᵃ, inclusive, and the tenth consists of the slide wire 77. Assume that the carriage 92 is placed with the contact arm 95 on contact stud 96 and assuming that a thermal E. M. F. is generated by the thermo-couple 106, then this thermal E. M. F. may be traced from the positive terminal of the thermo-couple to the terminal 107, thence through a converter mechanism similar to that illustrated by the numeral 13 (Fig. 4), back to terminal 108, conductor 109, contact stud 96, contact arm 95, conductor 110, slide wire contact 111, switch 78, to the negative terminal of the thermal couple. The thermal E. M. F. impressed across the terminals 107, 108 acts, as described above in connection with Figs. 1 and 2, to control the operation of the motor 112 to correspondingly move the slide wire contact to the balancing position. Since the resistance of the slide wire 77 per unit length is only one-tenth of the main slide wire 76, it follows that for a given E. M. F. corresponding to a given temperature change, it is necessary to move the contact arm 111 ten times as far as is necessary when the slide wire 76 is in circuit. Consequently, if the primary indication attainable through the use of the slide wire 76 is readable to 5°, it follows that the secondary indication or open scale reading will be readable to one-half a degree. The manner of operation of the instrument of Fig. 7 with the switch 78 in its lower position is the same as that described in connection with Fig. 1. Thus the unidirectional E. M. F. generated by the thermal couple is converted by the converter device 113 into a corresponding alternating current of a fixed frequency. This alternating current is then amplified by the amplifier 114 and the amplified current is applied to the motor 112 or to its control circuit to control its direction and duration of rotation. As the motor 112 rotates, the screw-threaded member 115 advances the carrier 116 in the proper direction to effect a balance, whereupon the screw-thread 115 ceases rotating. While the amplifier 114 may be of a single or double stage type when the instrument is to be used over a total range, that is, when the switch 78 is closed on its upper contact, it is advisable that an additional stage or stages of amplification be provided when the instrument is to be used for open scale reading, that is, with the switch 78 closed on its lower contact. Thus there is shown in Fig. 8 an additional stage which may be selectively cut into circuit when the instrument is to be used for open scale reading. In this figure the rectangle 114 represents a two-stage amplifier such as, for example, that shown in Fig. 1. The output of this amplifier is coupled to an additional stage 117 through a selective switch 118. When the switch 118 is thrown to its lower position, the amplifier stage 117 is connected effectively in circuit so that the control currents applied to the motor 112 are subjected to an additional stage of amplification. On the other hand, when the instrument is to be used for complete scale use, it may be only necessary to employ the two-stage amplifier 114, in which event the switch is thrown to its upper position wherein the motor 112 is connected directly to the output of the amplifier 114. As indicated in Fig. 8, the switch 78 of Fig. 7 may be combined with the switch 118 so that by a single manipulation the proper slide wire may be cut into circuit and the proper number of stages of amplification may simultaneously be cut into circuit. While any well-known form of switch structure may be used for this purpose, there is shown in Fig. 9 a schematic diagram of a preferred form of switching arrangement. In this embodiment the switch comprises two sets of contacts, one set comprising contacts 119 to 124, inclusive, and the other set comprising contacts 125 to 130, inclusive. Contacts 119 and 120 correspond to contacts 119ᵃ and 120ᵃ (Figs. 7 and 8), contacts 121 and 122 correspond to contacts 121ᵃ and 122ᵃ (Fig. 8), contacts 123 and 124 correspond to contacts 123ᵃ and 124ᵃ (Fig. 8), contact 126 corresponds to contact 126ᵃ (Figs. 7 and 8), contact 128 corresponds to contact 128ᵃ (Fig. 8), contact 130 corresponds to contact 130ᵃ (Fig. 8). Contacts 120—125 are connected together by a jumper wire, as are the contacts 122—127 and contacts 124—129. Each of the contact sets is mounted adjacent a corresponding opening 131—132 in an insulating strip 133. Adapted to be inserted through the openings 131—132 is a plug 134 which carries three separate contact rings 135, 136, 137. From the foregoing, therefore, it will be obvious that when the plug 134 is inserted in the opening 131 the instrument operates for total scale work, and at the same time the additional stage 117 of the amplifier (Fig. 8) is deleted from the circuit. On the other hand, when the plug 134 is inserted in the opening 132, the instrument is connected for open scale reading and the additional amplifier stage 117 is then connected in circuit.

It will be understood, of course, that any well-known form of recording chart may be used in conjunction with the carriers 92 and 116, it being understood that each of these members carries a recording pen or stylus to record on the chart. The pen carried by the member 116 will therefore record on the chart a record of temperature, while the pen carried by the member 92 will record, preferably in a different color, a straight line to indicate whether the associated temperature record is an open scale or a full scale record; that is to say, when this latter straight line is at the extreme left of the chart it indicates that the readings are full scale, and if this line appears at any intermediate position towards the right, it indicates that the associated readings are open scale from which the recorded temperature may be instantly determined.

While the invention has been described, for purposes of explanation, as embodied in a device for measuring and/or recording, it will be understood that one of the important aspects of the invention is its application to control purposes. For example, the amplified output of the converted current instead of (or in addition to) recording temperature, may be used to control a furnace or similar device for maintaining the temperature constant or within a predetermined range.

In carrying out this phase of the invention the motor 9 of Fig. 1, or the motor 29 of Fig. 5, for example, may be disconnected from the lead screw 8 and the carriage 7 is moved manually to bring the pointer 10 into alignment with the desired temperature marking on scale 11. The control member, such as member 66 of Fig. 5, is disconnected from disc 63ᵃ and is replaced by a contact arm such as arm 140 of Fig. 10. The arm 140 is adapted to be operated by a polarized relay, or by a dynamometer such as dynamometer 70 (Fig. 6), and in its normal or neutral position is midway between the associated fixed contact sets 141—142, and 143—144. If now the temperature of the thermocouple falls below the desired temperature at which the pointer 10 is set, the excess differential E. M. F. at the potentiometer converted and amplified as above described, causes the dynamometer to rotate in a clockwise direction, for example, to cause insulated contact 145 to bridge the associated contacts 143, 144. The closure of these contacts may operate a suitable relay or similar device (not shown), which in turn may control a circuit or applying heat at the furnace or other location of the thermocouple. Thus, if the thermocouple is located in an electric furnace, the closure of the above-mentioned circuit acts to supply current to the furnace heating coils. The temperature is thereby raised and the E. M. F. thus generated by the thermocouple increases until it becomes greater than the balancing E. M. F. from the potentiometer slide wire 3. An excess of E. M. F. of opposite polarity is thus applied to converter 13, and after amplification, causes the dynamometer to rotate in a counter-clockwise direction, moving arm 140 away from contacts 143, 144 and causing insulated contact 146 to bridge contacts 141, 142, thus tripping a switch relay to cut off the supply of current to the heating coils. The temperature then falls to a point below the desired setting, and the above described cycle of operations is completed.

Various changes and modifications may be made herein without departing from the spirit and scope of the invention, for example, the converter and reconverter of Figs. 2 and 4 might be replaced by vibrating relays or similar devices.

What is claimed is:

1. In an instrument of the character described, a potentiometer having a full scale slide wire and an "open scale" slide wire, contact arms for said slide wires, a device for moving said contact arms, means for selectively applying E. M. F.'s to be measured to said slide wires, means to derive from said E. M. F.'s an alternating current of fixed frequency, means for amplifying said fixed frequency currents, and means for applying the amplified currents to control said device.

2. In an instrument of the character described, the combination of a potentiometer having a pair of slide wires, a device for deriving from E. M. F.'s to be measured an alternating current of fixed frequency, a plural stage amplifier for amplifying said alternating current, means for selectively rendering each of said slide wires effective, and means for selectively rendering one or more stages of said amplifier effective.

3. In an instrument of the character described, the combination of a potentiometer having a main slide wire, an auxiliary slide wire, a device for converting unidirectional currents to be measured into corresponding alternating currents, a plural stage amplifier for said alternating currents, a switch device effective in one position to apply the E. M. F.'s to be measured to one slide wire and simultaneously to render effective a selected stage of the amplifier, said switch being effective in another position to apply said E. M. F.'s to the other slide wire and to render effective another stage of the amplifier.

4. In an instrument according to claim 3 in which each slide wire is provided with a movable contact arm, a motor for moving said arms, and means for applying the amplified currents to control said motor.

5. In an instrument of the character described, the combination of a potentiometer having a main slide wire and an auxiliary slide wire, a device for converting unidirectional currents to be measured into corresponding alternating currents, means responsive to said alternating currents, a plurality of fixed resistors, a switch effective in one position to apply the E. M. F.'s to be measured to said main slide wire and effective in another position to apply said E. M. F.'s to said auxiliary slide wire through said fixed resistors, and means for selectively rendering a predetermined number of said fixed resistors ineffective.

6. In an instrument of the character described, the combination of a potentiometer having a main slide wire and an auxiliary slide wire, contact arms for said slide wires, a device for moving said contact arms, a plurality of fixed resistors, means for selectively applying E. M. F.'s to be measured directly to said main slide wire or to said auxiliary slide wire through said fixed resistors, means for selectively rendering a predetermined number of said fixed resistors ineffective, means to derive from said E. M. F.'s an alternating current of fixed frequency, means for amplifying said fixed frequency currents, and means for applying the amplified currents to control said device.

7. The method of measuring direct currents of minute magnitude which comprises opposing the E. M. F.'s producing said currents to a standard E. M. F. of known magnitude, deriving an alternating current from the resultant of said opposed E. M. F.'s of fixed frequency and of one phase or of opposite phase depending upon whether the standard or unknown E. M. F. is predominant, amplifying said alternating current at said frequency, reconverting said amplified current into a continuous current flowing in one direction or the other accordingly as said alternating current is of said one phase or said opposite phase, and applying said continuous current directly to effect a balance between said opposed E. M. F.'s.

8. Means for selectively controlling a reversible electrical motor for rotation in one direction or the other in response to variations in one direction or the other in a minute direct current E. M. F. from a predetermined value including a standard direct current E. M. F of known magnitude, comprising means for opposing said E M. F.'s, means for deriving an alternating current from the resultant of said opposed E. M. F.'s of one phase or of opposite phase depending upon whether the unknown or standard E. M. F. is the greater, means for amplifying said alternating current, means for reconverting said amplified current into a continuous current flowing in one direction or the other accordingly as said alternating current is of said one phase or said opposite phase, and means for applying said reconverted current to said motor.

9. Means for selectively controlling a reversible electrical motor for rotation in one direction or the other in response to variations in a minute direct current E. M F., including means for deriving an alternating current from said E. M. F., means for amplifying said alternating current, means for reconverting said amplified current into a continuous current flowing in one direction or the other, in selective accordance with the direction of said E. M. F., and means for applying said reconverted current to control said motor.

10. Means responsive to variations in a minute direct current E. M. F. for selectively controlling a reversible electrical motor having two windings, a connection from one of said windings to an original source of electrical current, a rectifier adapted to control the other of said windings for selectively controlling the direction of rotation of said motor, means for deriving an alternating current from said E. M. F., means for amplifying said alternating current, and means connecting said amplifying means and said rectifier.

11. An instrument of the potentiometer type, a pair of terminals for connection to a source of unidirectional E. M. F., a motor device having two windings for automatically adjusting said potentiometer, a connection from one of said windings to an original source of oscillating current, means between said terminals and said motor for deriving from the residual potentiometer current an oscillating current, means for amplifying said derived oscillating current and applying the amplified current to the other winding of said motor device, and means for adjusting the phase displacement of the oscillating currents in said windings.

12. An instrument of the potentiometer type, a pair of terminals for connection to a source of unidirectional E. M. F., a motor device having two windings for automatically adjusting said potentiometer, a connection from one of said windings to an original source of oscillating current, means including interrupting means between said terminals and said motor for deriving from the residual potentiometer current an oscillating current, means for amplifying said derived oscillating current and applying the amplified current to the other winding of said motor device, and means for adjusting the phase displacement of the oscillating currents in said windings comprising means for adjusting said interrupting means.

13. Means responsive to variations in a minute direct current E. M. F. for selectively controlling a reversible electrical motor having two windings, a connection from one of said windings to an original source of electrical current, a rectifier responsive to the phase of the alternating current to be rectified, a connection from the other of said windings to said rectifier, means for deriving an alternating current from said E. M. F. of one phase or of opposite phase dependent upon the direction of said minute E. M. F., means for amplifying said alternating current, and means connecting said amplifying means and said rectifier.

14. An instrument of the potentiometer type, a pair of terminals for connection to a source of unidirectional E. M. F., a device for adjusting said potentiometer and including a driving shaft, a driven shaft, a reversing clutch adapted to connect said driving shaft with said driven shaft selectively in one direction or the other, and means for controlling said reversing clutch including means between said terminals and said device for deriving from the residual potentiometer current an oscillating current, and means for amplifying said oscillating current and applying the amplified current to control the selective energization of said clutch, the said means between said terminals and said device including a commutator driven by said driving shaft.

15. In an instrument of the character described, a potentiometer having a full scale slide-wire and an "open scale" slide-wire, contact arms for said slide-wires, a device for moving said contact arms and including a driving shaft, a driven shaft, a reversing clutch adapted to connect said driving shaft with said driven shaft selectively in one direction or the other and at a speed relatively to the speed of the driving shaft dependent upon the adjustment of said clutch, means for selectively applying E. M. F.'s to be measured to said slide-wires, means to derive from said E. M. F.'s an alternating current of fixed frequency, means for amplifying said fixed frequency currents, and means for adjusting said clutch proportionately to the amplified current.

16. The combination of claim 15 in which said last mentioned means includes a torque coil energized by said amplified current.

HUMPHREY F. PARKER.
JULIUS G. ACEVES.